US008996489B2

(12) United States Patent
Leblanc et al.

(10) Patent No.: US 8,996,489 B2
(45) Date of Patent: Mar. 31, 2015

(54) METHOD AND SYSTEM FOR PUSHING CONTENT TO MOBILE DEVICES

(75) Inventors: Michael Leblanc, Fredericton (CA); Jody D. Glidden, Sterling, VA (US)

(73) Assignee: BlackBerry Limited, Waterloo (CA)

( * ) Notice: Subject to any disclaimer, the term of this patent is extended or adjusted under 35 U.S.C. 154(b) by 516 days.

(21) Appl. No.: 12/598,785

(22) PCT Filed: May 2, 2008

(86) PCT No.: PCT/CA2008/000851
§ 371 (c)(1),
(2), (4) Date: Apr. 23, 2010

(87) PCT Pub. No.: WO2008/134880
PCT Pub. Date: Nov. 13, 2008

(65) Prior Publication Data
US 2010/0205148 A1   Aug. 12, 2010

Related U.S. Application Data

(60) Provisional application No. 60/927,738, filed on May 4, 2007, provisional application No. 60/937,673, filed on Jun. 28, 2007.

(51) Int. Cl.
G06F 17/30 (2006.01)
H04L 29/08 (2006.01)
(52) U.S. Cl.
CPC ..................................... H04L 67/26 (2013.01)
USPC .......................................................... 707/705

(58) Field of Classification Search
USPC .......................................... 707/736, 737, 740
See application file for complete search history.

(56) References Cited

U.S. PATENT DOCUMENTS

| 2002/0001295 | A1* | 1/2002 | Park .............................. 370/338 |
| 2002/0066026 | A1 | 5/2002 | Yau et al. |
| 2004/0127235 | A1 | 7/2004 | Kotzin |
| 2004/0199665 | A1 | 10/2004 | Omar et al. |
| 2005/0011957 | A1* | 1/2005 | Attia et al. ............... 235/462.46 |
| 2005/0043060 | A1 | 2/2005 | Brandenberg et al. |
| 2005/0050172 | A1* | 3/2005 | Redpath ........................ 709/219 |
| 2006/0171380 | A1 | 8/2006 | Chia |
| 2006/0224943 | A1* | 10/2006 | Snyder et al. ............... 715/501.1 |
| 2006/0229065 | A1 | 10/2006 | Lazaridis et al. |
| 2007/0061331 | A1 | 3/2007 | Ramer et al. |

FOREIGN PATENT DOCUMENTS

| EP | 1523154 A1 * | 4/2005 |
| WO | 02076077 A1 | 9/2002 |
| WO | 2006077283 A1 | 7/2006 |

OTHER PUBLICATIONS

European Patent Office, Extended European Search Report for Application No. 08748253.5, May 4, 2010.
Canadian Intellectual Property Office, Office Action Dated Mar. 22, 2013, issued in Canadian Patent Application No. 2,686,243.
(Continued)

*Primary Examiner* — Hung Q Pham
(74) *Attorney, Agent, or Firm* — Ridout and Maybee LLP

(57) ABSTRACT

A method of pushing content, such as eLearning packages, to mobile devices is disclosed. The content push stores the content locally on the user's mobile device so the content can be viewed offline.

16 Claims, 4 Drawing Sheets

(56) References Cited

OTHER PUBLICATIONS

WIPO, International Preliminary Report on Patentability, dated Nov. 10, 2009, issued on PCT/CA2008/000851.
Barker Brettell, Response to Extended European Search Report, filed in EP 08 748 253.5, dated Jul. 29, 2010.
European Patent Office, Communication pursuant to Article 94(3) EPC dated Apr. 11, 2014, issued in corresponding European Patent Application No. 08748253.5.
Canadian Intellectual Property Office, Examiner's Requisition Dated Mar. 4, 2014 issued in corresponding Canadian Patent Application No. 2,686,243.

* cited by examiner

METHOD AND SYSTEM FOR PUSHING CONTENT TO MOBILE DEVICES

REFERENCE TO RELATED APPLICATIONS

The present application claims the benefits, under 35 U.S.C.§119(e), of U.S. Provisional Application Ser. No. 60/927,738 filed May 4, 2007 entitled "METHOD AND SYSTEM FOR PUSHING CONTENT TO MOBILE DEVICES" and Ser. No. 60/937,673 filed Jun. 28, 2007 entitled "METHOD AND SYSTEM FOR DEPLOYING A HOSTED CONTENT PUSHING SOLUTION SECURELY TO MOBILE DEVICES" which are incorporated herein by this reference.

TECHNICAL FIELD

The invention relates to the field of delivery of content such as graphics, audio and video to mobile devices.

BACKGROUND

Mobile content authoring systems exist in the market today. These are used in conjunction with learning management systems or content management systems to allow an author to create mobile content, assign it to a user and track its usage. The main problem is that once the content is created and assigned to users, it is typically stored on a central server. Users with mobile devices are required to access this central server, authenticate themselves, and then retrieve/download the content for viewing. They must be online to retrieve and view the content. They must also remain online while viewing the content. Network latencies in retrieving large content files, such as video files, are apparent as the user is waiting for them to download while viewing. There are other models where a user utilizes their computer's desktop software to pull down the content, and then the desktop software sends the content to a connected mobile device for playback. Playback can occur in these environments even if the device has no network connectivity. No usage tracking, which is particularly important for training systems, can occur in this model.

Notifications are typically sent to the mobile users via email to tell the user that there is new content available for them. They must then access the server when they are online to get to the content. This is how mobile content players function in general when part of a central authoring, publishing, and tracking system. They need to access a server, then initiate a download/pull of the content. This is always user initiated on the device. This is essentially a mobile web browser/web server model. There are no provisions to run the content located on a central server offline (i.e. when there is no network coverage, such as on an airplane for example) and have the player smart enough to know that it is offline and should track progress locally offline and then synchronize when the user comes online again.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The invention described herein solves these problems by allowing a directed push of content to a user as soon as it has been assigned to them or based on some predetermined schedule. This content push encompasses all elements of the content and stores it locally on the user's mobile device. A content player is also provided that is network aware and not only renders the pushed content, but also queues tracking information if the user is not online. It renders the content from its local store so the user does not have to be online. There are no latency issues with running the content because it is all stored locally on the mobile device. Notifications are sent to the device when the content material has been successfully pushed. A user can view the content while going in and out of network coverage areas because the content is local to the device.

More particularly the invention provides a method of pushing content to one or more of a plurality of mobile devices over a computer network, comprising:
  i) creating a plurality of content files and storing the plurality of content files in a content database accessible to the computer network;
  ii) selecting one or more of the plurality of content files to form a package for delivery to one or more target mobile devices;
  iii) generating a request file containing an identification of the target mobile devices and the addresses and types of the selected one or more content files;
  iv) delivering the request file to a pushing server; and
  v) pushing the selected content files to data storage means in the one or more target mobile devices. The invention also provides a computer readable storage medium having program code stored thereon, wherein the program code, when executed by a computer, performs the foregoing method.

The mechanism that pushes the content is independent of the mobile transport/platform being used to actually do the push. The preferred implementation uses the BlackBerry platform, but other mobile platforms with push capabilities can be used as well.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The term "mobile device" is used herein to refer to mobile wireless communication devices which communicate over a communication network, including cellular telephones, mobile phones, smartphones, wireless laptop computers, Blackberries, personal digital assistants (PDAs), pagers and the like.

"eLearning" refers to computer-enhanced education. "Mobile learning" or "mLearning", involves learning with portable technologies, where the learner interacts using mobile devices, such as within a classroom, for on the job training or for training in any remote location.

The term "push" is used herein to refer to a method of content delivery to a mobile device whereby the content is automatically delivered by a content server without any action being required on the part of the mobile device user.

The term "pull" is used herein to refer to a method of content delivery to a mobile device that is initiated by the mobile device requesting the content from a content server with or without any action being required on the part of the mobile device user.

The term "content" includes one or more digital media types that when combined create a document or a content package. This package can have text, images, video, audio and other media types in it. It can also contain assessment or survey questions which can be completed after the content has been viewed in order to assess the user's understanding of the content material or to provide feedback. The content can be packaged as a Mobile Learning course to be used for training purposes, or the content can be a product fact sheet on a new product offering that needs to get to the mobile device users immediately, or an MP3 or ringtone file pushed from an online music store. Examples of content types are as follows: graphics; HTML, XML or some other markup; rich media including video and audio in any format; documents supported by native players on the devices.

Figure 1:
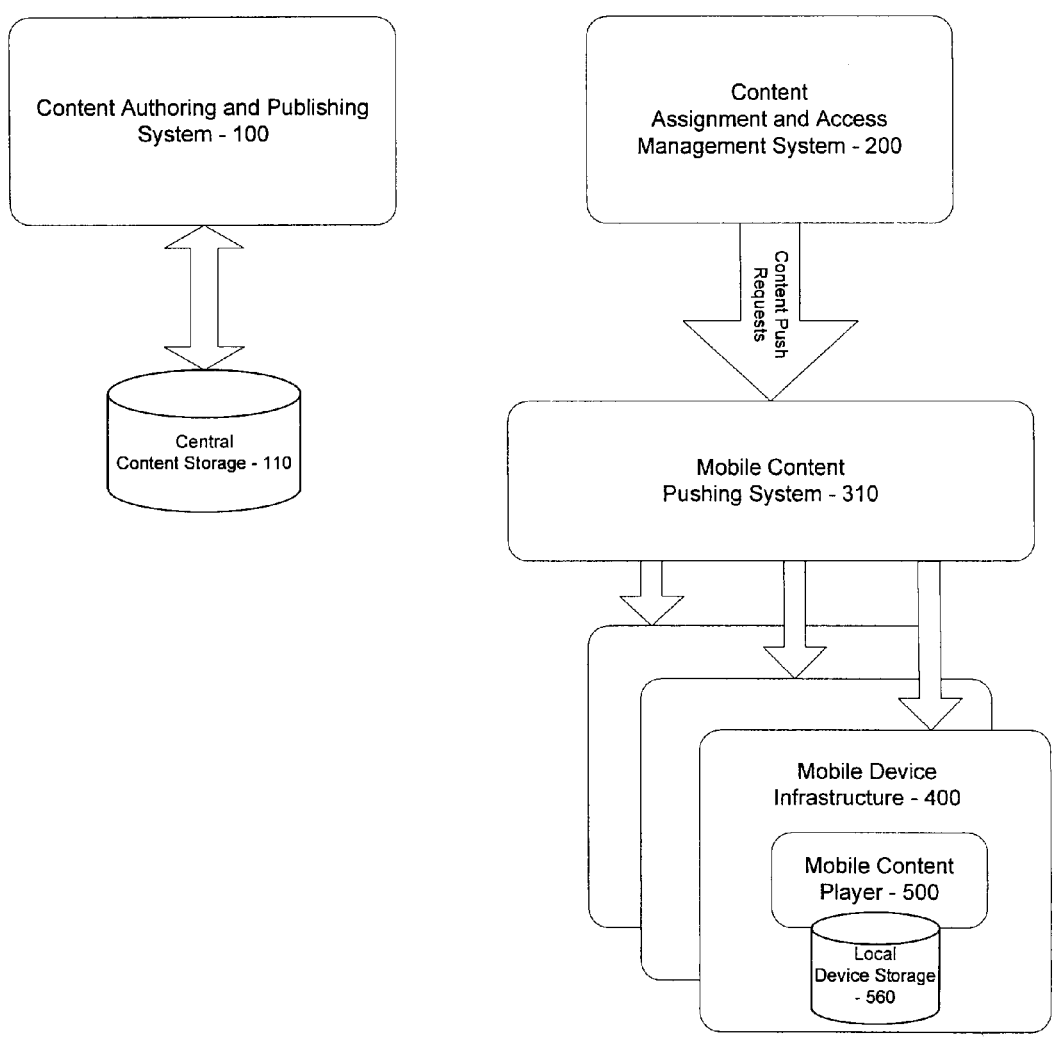
FIG. 1 is a schematic diagram illustrating the system used to carry out the invention.

FIG. 1 illustrates the components of the invention as described in the following sections.

Content Authoring and Publishing System—100

A number of systems are currently available for the creation and central storage of content formatted for mobile devices. The authoring of content in the present invention might also be accomplished by some different application then saved to a central server for access by mobile devices. For example an audio clip can be authored in an audio editing tool, saved, then published to a central content server. Another system can be used to manage access to the saved content.

Content Assignment and Access Management—200

Once the content has been created it can be assigned to users for consumption. This assignment is the trigger for the push to occur. Current content management systems can assign a user access to content, but they then expect the user to access the content server and retrieve the content when they want to view it. This invention provides that the content assignment functionality makes a request to the Mobile Content Pushing System 310 to send all the content directly to the user's mobile device. This request contains information on the type of content (for example an mLearning (Mobile Learning) Course), and user information so the push can be directed. It also contains information the pushing system requires to find all elements of the content to be pushed. The content assignment does not require any knowledge of the mobile transport/platform being used. This information is configured in the pushing system and is tied to a user's device type. Content assignment can also refer to the user having been subscribed to certain content areas and new content published in these areas is automatically assigned to the user. This component also can accept usage tracking from the mobile player.

Mobile Content Pushing System—310

Figure 2:
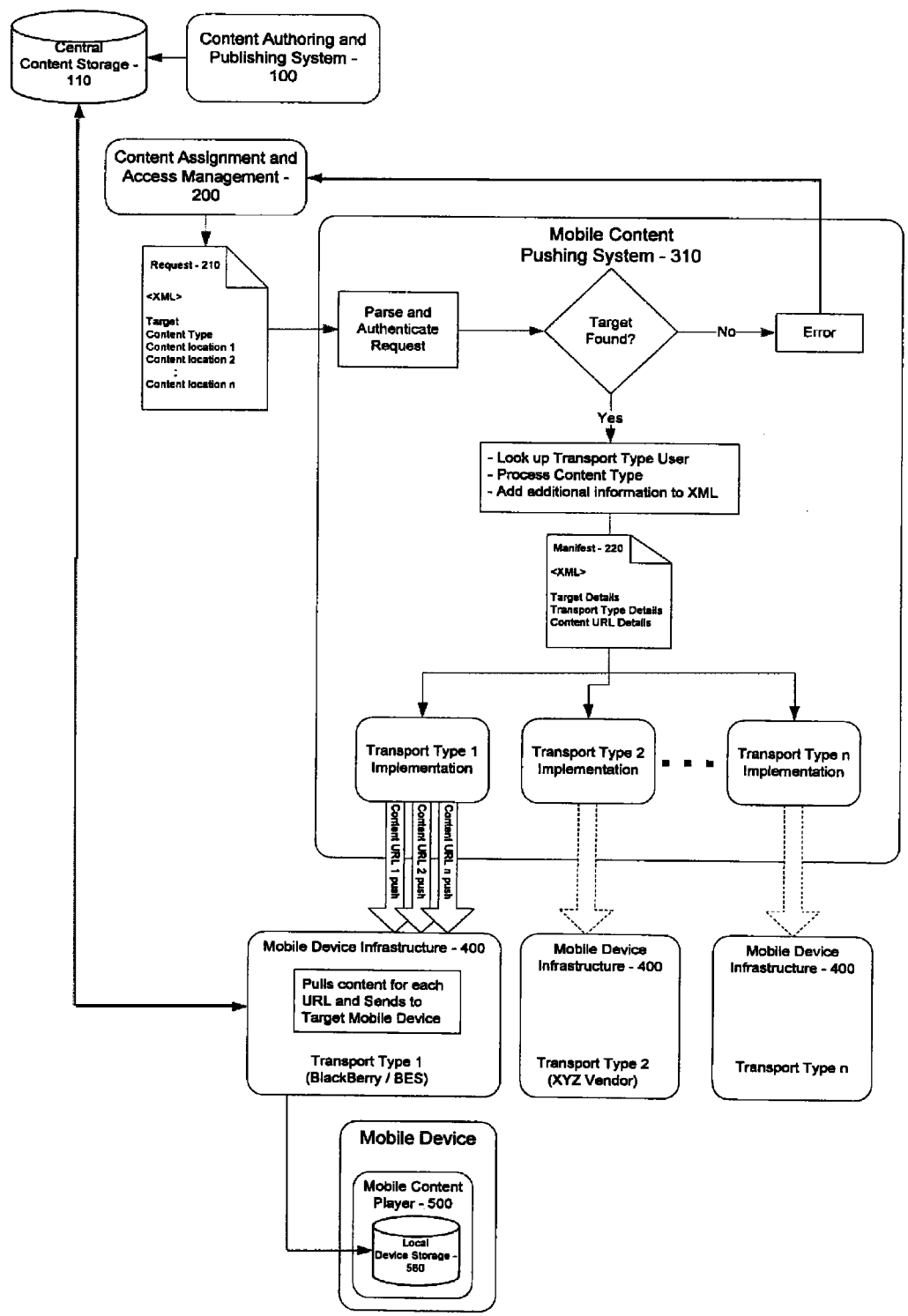
FIG. 2 is a flowchart illustrating the mobile content pushing method of the invention.

This component is illustrated in further detail in FIG. 2. It may be implemented as a web service. It receives requests for pushing content. These requests come from a system component that is assigning the content to users. The request is parsed, verified to be in the proper format and is then processed. The Request 210 is an XML document that describes the content that is being pushed and has the following elements.

Target—This is an identifier which identifies where the content needs to be pushed to. It is typically the user's email address. This is used to look up the type of device the user has, and then to establish the proper transport to be used to do the push.

Content Type—Based on this content type the Pushing system can intelligently establish the location of all the content to be pushed.

Content Location—This consists of one or more URLs of the content being pushed. When combined with the Content Type this component is able to locate all content dependencies that are required to be pushed to the Mobile device.

Once the Request 210 is received, the Mobile Content Pushing System 310 looks up the Target and determines if the Target has a mobile device and if that device has a transport defined. This will cause the following additional information to be gathered into an updated XML Manifest 220:

Transport Type—This is the Mobile device infrastructure that is used to actually push the content. For example the infrastructure may be Research in Motion's (RIM's) infrastructure which consists of their BlackBerry Enterprise Server (BES) and their BlackBerry Smartphones.

Transport Details—This consists of transport specific details that will be used to actually push the content. Each transport type will have its own details that are used by the Mobile Content Pushing System's implementation of the transport. This may be a BES Server name for example Additional Target Info—This may contain additional information required for the transport to successfully push the content. In the case of RIM it would be a device's PIN. Multiple identifiers are possible depending on the transport being used.

If the user does not have a mobile device or a transport has not been defined for it, then the appropriate response is returned to the Mobile Content Pushing System 310 identifying that the content package could not be delivered, and why. It is a requirement that every user in the content management system register with the Mobile Content Pushing System 310 to ensure the push can take place. Once all this information is gathered, the Mobile Content Pushing System 310 uses its implementation of the transport identified to send out the push requests.

Modifications to the content can occur after it has been pushed. It is up to the calling application to send a new push request for the content if it has changed. The system may also constantly monitor for changes in content and automatically push when it detects a change. In this way the content pushed to the mobile devices is always current.

The calling system makes a single push request for the content it wishes to send. This can be thought of as a content package. The content package can contain a single audio file, or a mobile learning course that consists of hundreds of individual content items. Each XML request represents a single launchable and assignable content package.

Mobile Device Infrastructure—400

As noted above, the Mobile Content Pushing System 310 can work simultaneously with several mobile platforms or transport types. FIG. 2 depicts three transport types. This invention can be implemented for example, to support the Research in Motion's (RIM's) Blackberry/BES platform, or another suitable platform. The transport type can be any transport that allows a real time push of content to a mobile device, or any other mechanism that puts the content directly onto the mobile devices over the air.

Either the Mobile Content Pushing System 310 can push the URL's of the content to the Mobile Device Infrastructure, or it can retrieve the content from Central Content Storage 110 and push the content files to the Mobile Device Infrastructure 400. In the former case, the Mobile Device Infrastructure 400 receives the URL for each content, retrieves the content from the Central Content Storage 110 and sends the content files to the Local Device Storage 560 of the mobile device. In the latter case, the Mobile Device Infrastructure 400 receives the content files and sends the files to the Local Device Storage 560.

Mobile Content

There is no limitation on the type of content that can be pushed. Any digital file can be pushed. The content being pushed to the mobile devices should be compatible with the mobile content player on the device itself. For example, a video encoded for a PC might not work on the mobile device's media player. Examples of content types supported by the invention are as follows:

Graphics

HTML, XML or some other markup. XML can contain surveys or assessments for example.

Rich Media including video and audio, and animation in any format.

Documents supported by native players on the devices.

Mobile Content Player—500

A suitable mobile content player understands how to render various content types. It accepts the pushing of content from the Mobile Content Pushing System 310 through the Mobile Device Infrastructure 400. The mobile device receiving the content triggers all notifications. When the content package has been delivered, the Mobile Content Player 500 provides a visual notification and reports the delivery status back to the central content server. The server then sends a notification via email to the mobile device. These are configurable notification options on the Mobile Content Pushing System 310.

Once content is pushed to the mobile device it remains in its Local Device Storage 560 for the Mobile Content Player 500 to render it. The pushed content can be removed from either the Mobile Content Player 500 itself or as a command from the Mobile Content Pushing System 310. If the Mobile Content Player 500 attempts to render content that has been removed from its Local Device Storage 560 then it will automatically attempt to retrieve the content from the content server.

This invention also facilitates the playing of content in an offline environment. This means that the device's radio antenna can be turned off to board a flight, for example, and the user can still access the content because it has been already pushed to the device. The Mobile Content Player 500 will also detect that the mobile system is offline and store all tracking information locally on the device. When it detects network coverage again and can access the content servers, all tracking progress is synchronized.

Figure 3:
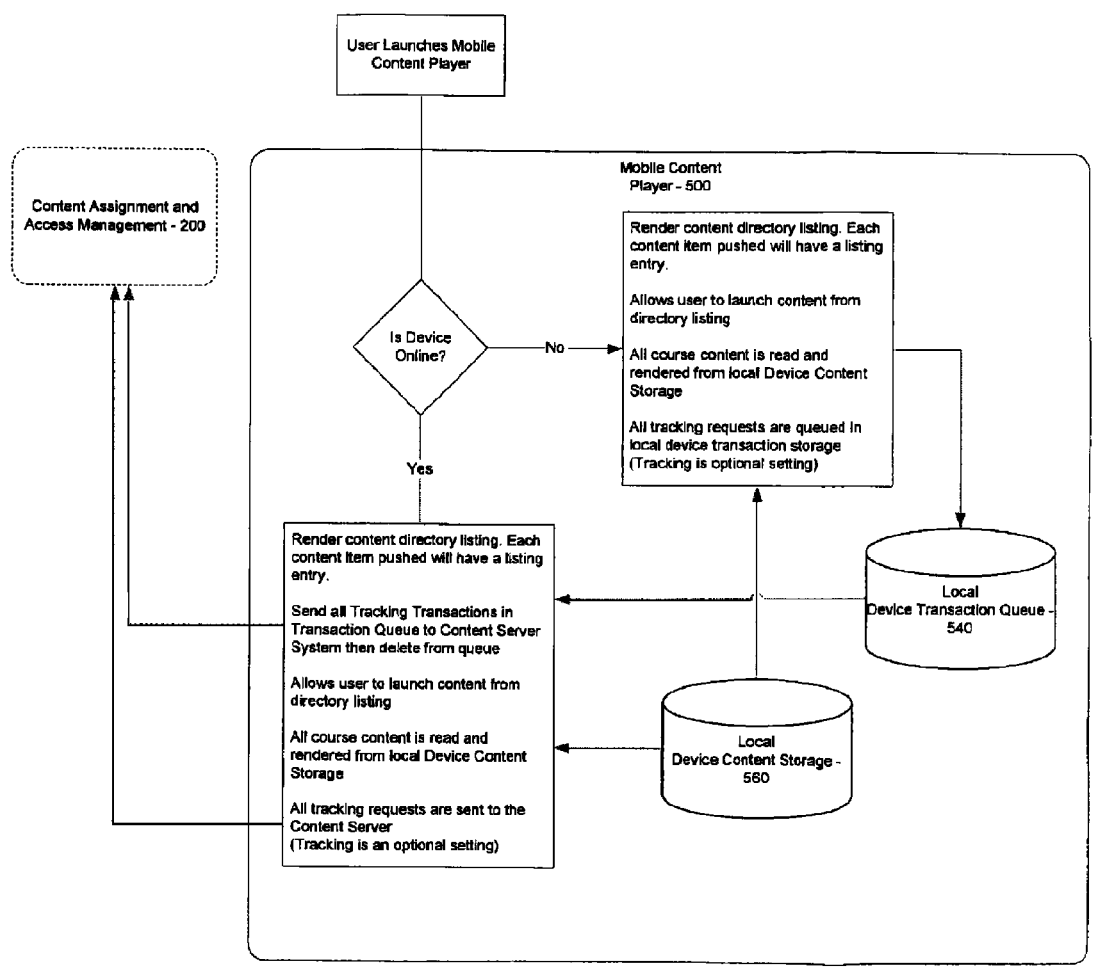
FIG. 3 is a flowchart illustrating the mobile content player of the invention in further detail.

FIG. 3 depicts the logic flow for the Mobile Content Player 500. The user first launches the Mobile Content Player 500 on the mobile device. If the device is online, it renders a content directory listing. Each content item listed will have a listing entry. It then sends all tracking transactions in the Local Device Transaction Queue 540 to the Content Assignment and Access Management 200 and deletes them from the queue. This allows the user to launch content from the directory listing. All content is then read and rendered from the Local Device Content Storage 560. All tracking requests are sent to the Content Assignment and Access Management 200. Tracking is an optional setting.

If the mobile device is not online, it also renders a content directory listing. This allows the user to launch content from the directory listing. All content is read and rendered from the Local Device Content Storage 560. All tracking requests are queued in the Local Device Transaction Queue 540. Once the mobile device is online, then the tracking information is forwarded to the central content server. Tracking is an optional setting.

Due to the increased requirement for local memory on the mobile device in this system, it is preferred that the mobile device have an expansion memory such as an SD card secondary storage. In that way the content can be pushed directly to the SD card.

Additional Configurations

The solution can also make use of caching servers for content pushing. When a push occurs the content is retrieved from a local caching server instead of the centralized content server.

Figure 4:
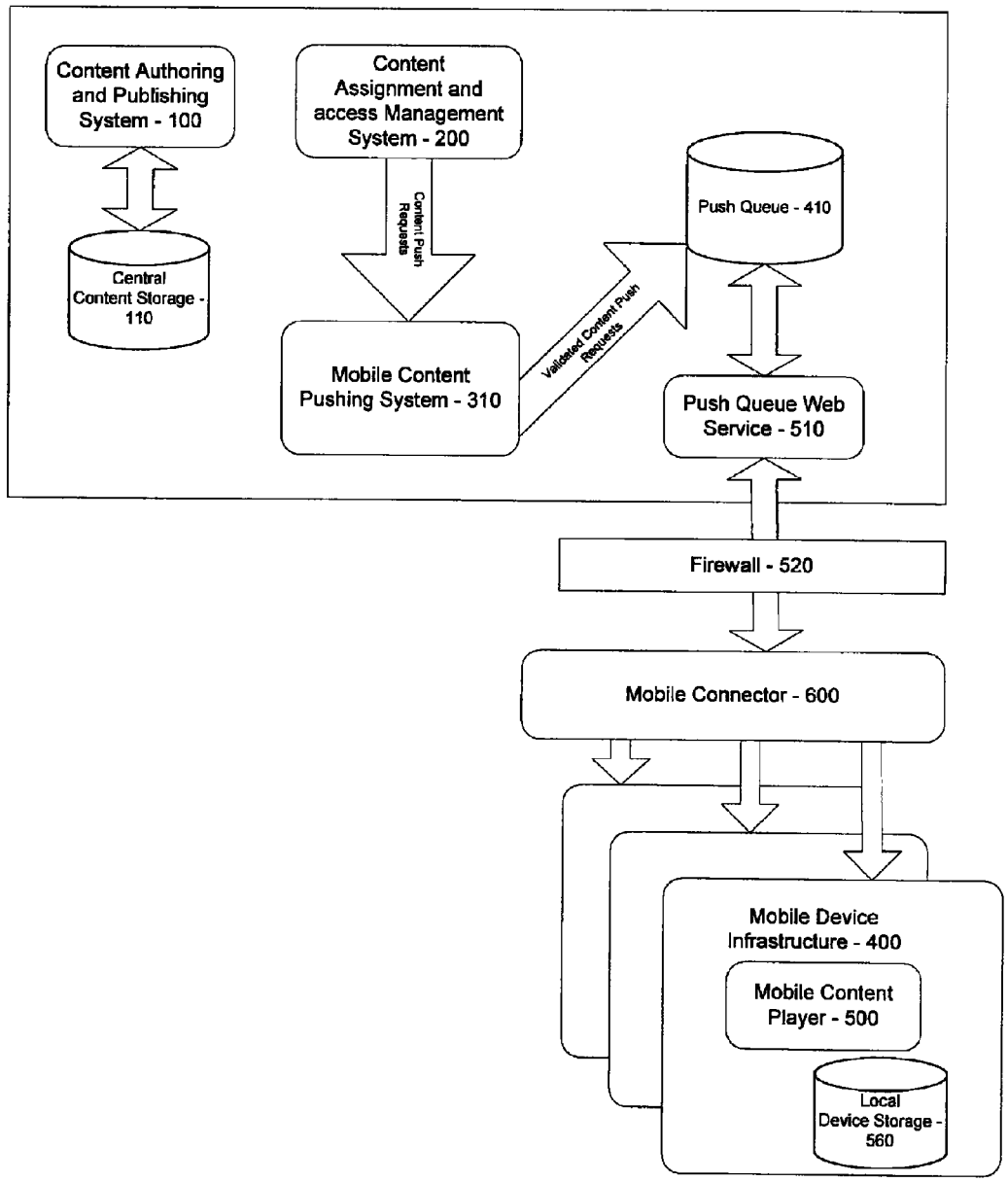
FIG. 4 is a schematic drawing illustrating a further embodiment of the method and system of the invention.

In some environments there is a Firewall 520 between the Mobile Content Pushing System 310 and the mobile transport being used to do the pushing. The firewalls do not allow access from the pushing system to the mobile transport for security reasons. This is mainly due to the fact that the initiation of the push happens from outside the firewall. In order to accommodate such environments, a Mobile Connector 600 is provided that is located behind a company's Firewall 520 and will pull push requests from the Content Authoring and Publishing System 100 and then send through the mobile transport. This works as follows and as shown in FIG. 4.

Upon determining that content needs to be pushed to a mobile user, the push requests are put into a queue on the Push Queue 410. This server is polled using a particular frequency by the Mobile Connector 600 which reads the queue and pops off any push requests, and then sends them through the Mobile Transport. This polling can take place in near real-time so the latency from making the push request to the device actually receiving the pushed content is very small.

In order to push content to a mobile device using an implementation of this invention using the BlackBerry platform, a direct connection is needed from the pushing system to the Mobile transport. Most companies have their mobile transport located behind a corporate firewall 520. This means that the content pushing mechanism requires a direct connection to the Mobile transport (BlackBerry Enterprise Server—BES which forms part of the Mobile Device Infrastructure 400 in this case) in order to push content to it. So the system to author content and push it to the mobile devices would need to reside behind the firewall along with the BES or it would have to be granted access through the company's firewall to access the Mobile Device Infrastructure 400 and BES. This creates a security problem in that it is a security risk for companies to open up their firewalls to allow these pushes to occur when the content authoring and pushing system is hosted in an application service provider (ASP) environment. It is also a problem that companies need to install the content authoring and pushing system behind their firewall and cannot take advantage of the hosted deployment.

This invention allows the Content Authoring and Pushing System 100 to reside in a hosted ASP environment while still allowing pushes to occur without the need to be granted access to a Mobile transport (e.g. BES) through a corporate Firewall 520. It accomplishes this by providing separate components contained in the Mobile Content Pushing System 310 to utilize queuing technology and Web Services to facilitate content pushing through a Firewall 520.

As shown in FIG. 4, an embodiment of this invention adapted for use with firewalls is comprised of a number of components that work together to allow mobile content pushes through firewalls. These are described in the following sections.

The Content Authoring and Publishing System 100 and the mobile content created by same in this embodiment are as described above. Similarly the Content Assignment and Access Management System 200 functions as described above. In this embodiment the content assignment functionality makes a Request 210 as described above to the Mobile Content Pushing System 310 to send all the content directly to the user's mobile device. This request contains information on the type of content (for example, a Mobile Learning Course) and target user information, so the push can be directed to individual users. It will also contain information the pushing system requires to find all elements of the content to be pushed. The content assignment does not require any knowledge of the mobile transport/platform being used. This information is configured in the Mobile Connector System 600 and is tied to a user's device type.

Mobile Content Pushing System—310

This part of the invention functions in the same way as the Mobile Content Pushing System 310 described above with further modifications are described below. This component receives requests for pushing content. These requests come from a system component that is assigning the content to users. The request is verified to be in the proper format then processed. As described above, the Request 210 is an XML document that describes the content that is being pushed and has the elements as described above, namely target, content type and content location. Once the content location is received, the Mobile Content Pushing System 310 looks up the Target and determines if they have a mobile device and if that device has a transport defined. This will cause the additional information as described above to be gathered for the updated Manifest 220: transport type, transport details and additional target information.

If the user does not have a mobile device or a transport has not been defined for it, then a response to that effect is returned to the Mobile Content Pushing System 310. It is a requirement that every user in the content management system register with the Mobile Content Pushing System to ensure the push can take place. Once all this information is gathered, the Mobile Content Pushing System 310 places the XML Manifest 220 onto a Queue with a status of "New". This is shown in FIG. 4 as Push Queue 410. Each XML Manifest 220 is also populated with a company identifier that determines which company is authorized to view the XML Manifest 220 on the queue.

Modifications to the content can occur after it has been pushed. It is up to the calling application to send a new push request for the content if it has changed. Alternatively the system can constantly monitor changes in content and automatically push when it detects a change. This way the content pushed to the Mobile devices is always current.

Push Queue Web Service—510

This component listens for requests made by the Mobile Connector 600. These are requests to determine if there are items on the Push Queue Web service 510 that the Mobile Connector 600 is able to extract.

Mobile Connector—600

This component is installed behind a company Firewall 520. It polls the Push Queue Web Service 510 at pre-defined intervals to determine if there is any content available that needs to be pushed. The company Firewall 520 is configured to allow the Mobile Connector 600 to make connections to the server which runs the Push Queue Web Service 510. This is acceptable because the transaction originates from inside the firewall. The Firewall 520 simply allows the communication between the Mobile Connector 600 and the Mobile Content Pushing System 310. It is not concerned with what data is actually in the connection stream.

Each Mobile Connector 600 is configured for a specific company. Companies can have more than one connector. The ASP Hosted solution supports many connectors. The Mobile Connector 600 issues a web services call to the Push Queue Web Service 510. This request contains user credentials that the web service authenticates against to determine what queue items the Mobile Connector 600 is authorized to see. If there are no items, then the Mobile Connector 600 just waits a pre-defined interval then tries again. If it does find an item on the queue, then the Mobile Connector 600 retrieves the queued item as an XML document describing the content. It can only process one queued item at a time. The XML document is described above in Mobile Content Pushing System 310.

Once the Mobile Connector 600 receives XML request from the Push Queue Web Service 510 it looks up the required transport for the device type and performs the push on the Mobile Device Infrastructure 400. This push involves the Mobile Connector 600 extracting each content URL from the XML transaction and retrieving it from the Content Assignment and Access Management System 200 then sending it directly to the BES server in the case of the RIM's Mobile Device Infrastructure. It retrieves each content item via its URL through the firewall as well. Again this is a connection initiated from inside the firewall.

The use of this queuing structure is useful even in non-firewall protected systems. By implementing a Push Queue 410, this allows for:

Reliable delivery. The item can stay in queue until the mobile content player has acknowledged that it has successfully received all of the content package. This allows the system to incorporate retries of queued items.

Control the speed of content deliveries in order to manage load on the Mobile Device Infrastructure 400. The queue can provide a mechanism to control the sped at which content is pushed to devices (throttling). An option is to set the system to only retrieve items off the queue at a longer interval if there is a concern that there will be too much load on the mobile infrastructure.

The Mobile Connector 600 returns result codes back to the Push Queue Web Service 510 based on its ability to successfully send the push request to the Mobile Device Infrastructure 400.

Mobile Device Infrastructure—400

This Mobile Connector 600 can work simultaneously with several Mobile platforms or transport types, including Research in Motion's BlackBerry/BES platform. This can be any transport that allows a real time push of content to a mobile device, or any mechanism that puts the content directly onto the mobile devices over the air.

Mobile Content Player—500

The Mobile Content Player 500 is identical to that described above. The solution can also make use of caching servers for content pushing. When a push occurs the content is retrieved from a caching server instead of the centralized content server.

Applications of this Technology

The invention has application, for example, in the following applications:

i) Training systems where courses are pushed to mobile users and groups upon enrollment/assignment, particularly mLearning courses. It is also useful for news readers through RSS feed push. Existing systems poll RSS sites to determine if there are any changes. The Mobile Content Pushing System 310 can accept an RSS pointer and retrieve all documents in it and push to the device to be read offline.

ii) News reader through RSS feed push. Existing systems poll RSS sites to determine if there are any changes. The Mobile Content Pushing System 310 can accept an RSS pointer and retrieve all documents in it and push to the device to be read offline.

iii) The present invention is also useful in implementation of podcasting functionality. A user may subscribe to some podcasts which are essentially video and audio. The subscription engine would then issue a request to the Mobile Content Pushing System 310 to push the audio or video file to the device. Once pushed the user would be able to invoke the Mobile Content Player 500 to play the media. This could be implemented as a hosted web based application where users can register their device to receive these pushes.

The present invention's infrastructure would also facilitate the pushing of live content or feeds of data to devices. For example this could be stock information delivered by a web service. The queue would contain the information to retrieve the feed and the Mobile Content Player 500 would retrieve the feed when it received the push of the feed information.

While a number of exemplary aspects and embodiments have been discussed above, those of skill in the art will recognize certain modifications, permutations, additions and sub-combinations thereof. It is therefore intended that the invention be interpreted to include all such modifications, permutations, additions and sub-combinations as are within its true spirit and scope.

What is claimed is:

1. A method of pushing content to one or more of a plurality of target mobile devices over a computer network, the method comprising:

selecting, by a content assignment system located remotely from the one or more of a plurality of target mobile devices, one or more stored content files to form a package for delivery to the one or more of the plurality of target mobile devices;

generating a request file containing one or more identifications of the one or more of the plurality of target mobile devices, and addresses and types of said selected one or more content files in the package;

delivering said generated request file to a pushing server; and sending, by said pushing server, the addresses of said selected content files to an infrastructure for said one or more of the plurality of target mobile devices automatically upon receipt of the request file from the content assignment system and without the selected content files being requested by the one or more of the plurality of target mobile devices;

retrieving, by the infrastructure, said selected content files from said content database using the sent addresses; and sending, by the infrastructure, said retrieved content files to one or more data storage devices in the one or more of the plurality of target mobile devices.

2. The method of claim 1 wherein prior to pushing said selected content files said pushing server determines transport types of said one or more of the plurality of target mobile devices.

3. The method of claim 1 wherein a push queue is formed at said pushing server to communicate with a connecting server between a firewall and said infrastructure for said one or more of the plurality of target mobile devices.

4. The method of claim 1 wherein there is a firewall between said infrastructure for said one or more of the plurality of target mobile devices and said pushing server, and a push queue is formed at said pushing server to communicate with a connecting server between said firewall and said infrastructure for said one or more of a plurality of target mobile devices.

5. The method of claim 1 wherein tracking is done offline and communicated to a content management system when said one or more of the plurality of target mobile devices are online.

6. The method of claim 1 wherein tracking is done while said one or more of the plurality of target mobile devices are online and communicated to a content management system.

7. The method of claim 1 wherein said request file is an XML file.

8. A non-transitory computer readable storage medium or media having program code stored thereon, wherein the program code, when executed by one or more computers at a content assignment system, performs a method comprising:

accessing and managing content files stored in a content database accessible to said computer network;

selecting, by the content assignment system located remotely from one or more of a plurality of target mobile devices, one or more of said stored content files to form a package for delivery to the one or more of a plurality of target mobile devices;

generating a request file containing one or more identifications of said one or more of the plurality of target mobile devices, and addresses and types of said selected one or more content files in the package;

delivering said generated request file to a pushing server; and sending, by said pushing server, the addresses of said selected content files to an infrastructure for said one or more of the plurality of target mobile devices automatically upon receipt of the request file from the content assignment system and without the selected content files being requested by the one or more of the plurality of target mobile devices;

retrieving, by the infrastructure, said selected content files from said content database using the sent addresses; and sending, by said infrastructure, said retrieved content files to one or more data storage devices in said one or more of the plurality of target mobile devices.

9. The non-transitory computer readable storage medium of claim 8 wherein prior to pushing said selected content files said pushing server determines transport types of said one or more of the plurality of target mobile devices.

10. The non-transitory computer readable storage medium of claim 8 wherein a push queue is formed at said pushing server to communicate with a connecting server between a firewall and said infrastructure for said one or more of the plurality of target mobile devices.

11. The non-transitory computer readable storage medium of claim 8 wherein there is a firewall between said infrastructure for said one or more of the plurality of target mobile devices and said pushing server, and a push queue is formed at said pushing server to communicate with a connecting server between said firewall and said infrastructure for said one or more of a plurality of target mobile devices.

12. The non-transitory computer readable storage medium of claim 8 wherein tracking is done offline and communicated to a content management system when said one or more of the plurality of target mobile devices are online.

13. The non-transitory computer readable storage medium of claim 8 wherein tracking is done while said one or more of plurality of target mobile devices are online and communicated to a content management system.

14. The non-transitory computer readable storage medium of claim 8 wherein said request file is an XML file.

15. A system for pushing content to one or more of a plurality of target mobile devices over a computer network, the system comprising:
   a content database accessible to the computer network and configured to store content files;
   a content assignment system located remotely from the one or more of a plurality of target mobile devices and configured to:
   select one or more of the stored content files to form a package for delivery to the one or more of the plurality of target mobile devices;
   generate a request file containing one or more identifications of the one or more of the plurality of target mobile devices, and addresses and types of the selected one or more content files; and
   a pushing server configured to:
   receive the request file delivered from the content assignment system, and
   send the addresses of said selected content files to an infrastructure for said one or more of the plurality of target mobile devices automatically upon receipt of the request file from the content assignment system and without the selected content files being requested by the one or more of the plurality of target mobile devices,
   wherein the infrastructure is configured to:
   retrieve said selected content files from said content database using the sent addresses; and
   send said retrieved content files to one or more data storage devices in said one or more of the plurality of target mobile devices.

16. A pushing server for pushing content to one or more of a plurality of target mobile devices over a computer network, the pushing server configured to:
   receive a request file delivered from a content assignment system located remotely from the one or more of the plurality of target mobile devices, the content assignment system having access over the computer network to a content database configured to store content files, the request file containing one or more identifications of the one or more of the plurality of target mobile devices, and addresses and types of one or more content files, stored in the content database, wherein the one or more content files are selected by the content assignment system to form a package for delivery to the one or more of the plurality of target mobile devices; and
   automatically upon receipt of the request file from the content assignment system and without the selected content files being requested by the one or more of the plurality of target mobile devices,
   send the addresses of said selected content files to an infrastructure for said one or more of the plurality of target mobile devices, wherein receipt of the addresses by the infrastructure causes the infrastructure to retrieve said selected content files from said content database using the sent addresses, and
   send said retrieved content files to one or more data storage devices in said one or more of the plurality of target mobile devices.

* * * * *